Patented Apr. 28, 1925.

1,535,438

UNITED STATES PATENT OFFICE.

EARLE C. PITMAN, OF PARLIN, NEW JERSEY, ASSIGNOR TO E. I. DU PONT DE NEMOURS & COMPANY, OF WILMINGTON, DELAWARE, A CORPORATION OF DELAWARE.

CELLULOSE ESTER OF REDUCED VISCOSITY AND PROCESS OF MAKING SAME.

No Drawing.   Application filed December 13, 1922.  Serial No. 606,740.

*To all whom it may concern:*

Be it known that I, EARLE C. PITMAN, a citizen of the United States, and a resident of Parlin, in the county of Middlesex and State of New Jersey, have invented certain new and useful Cellulose Esters of Reduced Viscosity and Processes of Making Same, of which the following is a specification.

This invention relates to the treatment of cellulose nitrate and other cellulose esters, while in the undissolved state, to change the viscosity-characteristic of the esters in such a way that the viscosity of a solution of the treated ester will be substantially less than the viscosity of the solution (in the same solvent and with the same ester content) of the untreated ester. More particularly my invention comprises the treatment of pyro (smokeless) powder in the undissolved state to change its viscosity-characteristic in the manner above indicated.

The kind of smokeless powder to which this invention is particularly adapted is known either as pyro smokeless powder or pyro powder, and may be defined as that grade of smokeless powder made from nitrocellulose almost completely soluble in a mixture of two parts by volume of ether to one part of ethyl alcohol and having a nitrogen content of about 12.60%. When the World War terminated in the year 1918, there existed large surplus stocks of this "pyro" powder originally containing about 0.5% of diphenylamine. The principal objections to the use of this powder in arts such as liquid coating compositions and cinematographic films, are (1) its relatively high viscosity, making difficult the preparation of solutions of high solid content, and (2) its dark color, due to the presence of diphenylamine introduced as a stabilizer, organic impurities (mainly decomposition products of the nitrocellulose and nitrodiphenylamines), and inorganic salts (chiefly iron derivatives).

The objection to the use of pyro powder in the arts on account of its dark color has been overcome to a great extent by the processes described and claimed in the application of R. G. Woodbridge, Serial No. 543475 and in the application of E. C. Pitman and G. F. Hunter, Serial No. 602230. Although the processes of these copending applications effect a substantial change in the viscosity-characteristic of the nitrocellulose (a change of this kind being hereinafter referred to as a reduction of the viscosity of the nitrocellulose), yet this reduction of viscosity, in so far as it is incidental to the removal of coloring matter, is for certain purposes too small, and the procedures in question, if used primarily to reduce the viscosity of the nitrocellulose to the required extent, are not economically satisfactory.

Strong alkalies in moderately high concentration have a powerful action on nitrocellulose. For example, if strong alcoholic or aqueous caustic soda be allowed to act on nitrocellulose it will gradually disintegrate it, dissolving part of it. Solutions of the residual nitrocellulose are low in viscosity, badly discolored, and contain considerable denitrated material. The denitrating action is altogether too strong to enable the commercial use of such a process.

Other known methods of reducing the viscosity of nitrocellulose include treatment with ultraviolet light or heat. Both these methods, as well as all methods of reducing viscosity after solution, have the disadvantage that they do not provide for the removal of the colored and unstable decomposition products which are produced in all known processes for viscosity reduction.

I have now made the surprising discovery that a rapid, extensive, and satisfactory reduction of viscosity of cellulose esters, and particularly of pyro powder, can be effected without entailing solution of the ester, by treating said cellulose ester in the undissolved state, either colloided or uncolloided, and preferably while stirring at a moderately elevated temperature, with an alkaline substance dissolved in a relatively large proportion of a liquid which has either no solvent action, or a comparatively low solvent action, on the ester, and, preferably also, which is an efficient extracting agent for the decomposition products formed. As typical of solutions for treating pyroxylin or pyro powder in accordance with my invention there may be mentioned 95% ethyl alcohol solutions containing less than 15% of metal acetates, or less than 2% of alkali-metal hydroxides.

It has been my experience that on reducing the viscosity of nitrocellulose solutions by the introduction of alkaline materials, even in small amounts, there is an increase in the yellow-brown color and the stability of the nitrocellulose is somewhat lowered. This undesirable increased color and decreased stability is avoided by the present process. Furthermore, reduction of viscosity prior to solution has advantages over reduction in solution in that it is possible to mix, more rapidly and with less power consumption, solutions of higher solids content, and these solutions are stable in viscosity immediately after mixing.

Although the treatment of the cellulose ester with an alkaline solution which is a non-solvent for said ester is the most important part of the new process, this step is preferably followed by (1) a bleaching of the ester with, for example, an aqueous or alcoholic calcium hypochlorite solution, (2) an acid wash, and then (3) an alcohol or water wash, where a very light colored product is desired. Thus, if a light colored nitrated linter of low viscosity is desired this can be accomplished by following the alcoholic sodium acetate digestion with an aqueous calcium hypochlorite bleach, a wash with dilute aqueous hydrochloric acid, and water washes. By applying this series of steps to a nitrated cotton linter having a viscosity value of 566 centipoises, I have obtained a product having a viscosity value of 160 centipoises.

These three supplementary steps, viz bleaching, digesting with a dilute acid solution, and then extracting with ethyl alcohol, are especially advantageous in the treatment of pyro powder, because of the amount of difficultly removable coloring matter in such powder. The treatment of pyro powder with a dilute aqueous or alcoholic acid, followed by extraction of the powder with alcohol is claimed broadly in application Serial Number 602230, mentioned above. In describing and claiming my invention as applied to pyro powder, the expression "a liquid which is practically a non-solvent for said powder" has reference, of course, only to the nitrocellulose constituent of the powder.

Pyro powder which is to be treated in accordance with my invention should be in such a physical condition as to expose a large surface, the area of this surface being desirably not less than 1,000 square feet per pound of powder. Thus, if the grain size of the powder available is too large, the powder may be ground (preferably under water or alcohol), or otherwise comminuted, to such a fineness that it will all pass through a 40-mesh sieve.

My invention may be further illustrated by the following examples:

1. Ground pyro powder was digested for about 16 hours at about 70° C. with ethyl alcohol containing 5% of sodium acetate, and then subjected to two short extractions (each lasting about one hour) with hot alcohol containing 0.25% hydrogen chloride, and one extraction with hot alcohol alone. The viscosity at 25° C. of a 10% solution of the powder in acetone was lowered from 2737 centipoises to 4.5 centipoises, a 99.84% reduction, by this treatment; and the low viscosity solution was clear and nearly water-white. An equal reduction by a treatment of the powder while in solution would have given a distinctly yellow-brown colored product.

2. Ground pyro powder was digested, while being stirred, for six (6) hours at a temperature of from about 60 to 70° C. with 5% alcoholic sodium acetate, and then washed with alcohol to remove sodium acetate. The viscosity of the powder was reduced from 5830 centipoises to about 65 centipoises by this treatment. When the same viscosity powder was subjected only to the bleach, acid, and alcohol treatment, the sodium acetate treatment being omitted, the final viscosity was about 1930 centipoises.

That the nitrocellulose reduced in viscosity to 65 centipoises is not appreciably degraded is shown by its high stability of 35–45 minutes (German test), and by the fact that there is no substantial decrease in its film-forming properties.

The solution that I have used as a standard for determining viscosity in example 2 and in the table given hereinafter is prepared by dissolving 8 oz. of nitrocellulose in 1 gallon of amyl acetate.

Following is a table showing to what extent viscosity is reduced by digestion at 60–70° C. with 5% sodium acetate in #2n denatured alcohol. In no case was any attempt made to remove color completely, but the samples were merely given two short washes in alcohol to remove the sodium acetate. The slower rate of viscosity-reduction, as compared with that attained in the two above examples, is due in part to the fact that in the experiments that provided data for the table the nitrocellulose was not stirred during digestion.

*Reduction in viscosity by digestion with 5% alcoholic sodium acetate.*

| Hours digestion in sodium acetate solution | Viscosity in centipoises at 28° C. of 8 oz. solution in amyl acetate | | | |
|---|---|---|---|---|
| | Pyroxylin (medium) | Pyroxylin (light) | Pyroxylin (heavy) | Powder CS #2 |
| 0 | 4280 | 566 | 218000 | 5900 |
| 2 | 2140 | | | |
| 4 | 1990 | 345 | 18800 | 340 |
| 6 | 962 | | | |
| 8 | 940 | 190 | 7710 | 110 |
| 10 | 442 | | | |
| 12 | 312 | | | |
| 14 | 287 | | | |
| 22 | 120 | | | |
| 24 | | 112 | 963 | 45 |
| 26 | 100 | | | |
| 30 | 85 | | | |

Water may be used instead of alcohol as a solvent for the sodium acetate, sodium hydroxide, sodium carbonate, or other alkaline substance, but although considerable reduction in viscosity is possible with aqueous solutions, the extent of this reduction is less than with alcohol, and removal of decomposition products is much less complete. Aqueous acetone also is for the same reasons less satisfactory than alcohol when used as the liquid medium.

The action of the alkaline solution on the nitrocellulose is slight in the cold and increases as the temperature is raised. By carrying out the treatment under pressure at a temperature above the normal boiling point of the liquid, a saving in time may be effected for a given reduction in viscosity. The viscosity-reducing action also increases as the concentration of the alkaline substance increases. The concentration of alkaline substance should preferably not exceed a concentration that would cause substantial degradation of the nitrocellulose at the temperature prevailing during the treatment.

By "substantial degradation" I mean a loss of desirable film-forming properties; such degradation does not, as a rule, occur so long as the reduction in nitrogen content (denitration) is not substantially in excess of about 1%. Thus in the case of a nitrocellulose containing 12.66% nitrogen, the film-forming properties were satisfactory where the denitration (occurring incidentally in the above described process) reduced the nitrogen content to 11.36%. A drop in the nitrogen content amounting, however, to 2 or 3% would, on the other hand, have indicated that the nitrocellulose was probably unsuitable for any use which would require good film-forming properties.

Where the ester to be treated is pyro powder the first two steps of heating with alcoholic sodium acetate and bleaching are desirably followed by digestion preferably with alcoholic HCl and then by extraction with hot alcohol. But where the ester whose viscosity is to be reduced is an uncolloided nitrocellulose such as ordinary pyroxylin, the first two steps above mentioned may be followed by a digestion with aqueous hydrochloric acid of about 1% concentration, and then by one or more hot water washes. By the term "hot" as applied to a liquid used in my process I mean a temperature between about 35° C. and the boiling point of the liquid in question under the pressure at which said liquid is being used.

By following the new process above outlined, pyro powder material, substantially free from decomposition products, may be obtained having a viscosity-characteristic such that its 8 oz. solution in amyl acetate has a viscosity at 28° C. of less than 1700 centipoises. Stated in another way, the viscosity of the pyro powder obtained by the above-described process is such that two to four pounds of said pyro powder material dissolved in a gallon of ethyl acetate or other true solvent of approximately its solvent power will give a flowable solution. The pyro powder material (and nitrocellulose in general) obtained by my process is further characterized by a solubility of not over 0.5% in 95% ethyl alcohol and by yielding 8 oz. amyl acetate solutions whose color is lighter than No. 9, frequently as light as No. 3, and in some cases as light as No. 2, on the Hazen platinum-cobalt standard.

It is apparently only by careful removal of the decomposition products resulting from the viscosity-reducing treatment, as well as by the removal of coloring matter initially present in the nitrocellulose or pyro powder, that low viscosity amyl acetate solutions having the degree of lightness above mentioned, can be produced.

As will be evident from a consideration of the table given above, either ordinary pyroxylin or pyro powder may have its viscosity-characteristic reduced to almost any desired extent without being dissolved, by heating said pyroxylin or pyro powder for a comparatively short time with alcohol containing sodium acetate or a stronger alkaline substance such as sodium hydroxide. The resulting product, a solid or undissolved nitrocellulose, especially after being washed with alcohol, is distinguished from products heretofore known, not only by the color of its solutions above described, but by having the same physical form as the pyroxylin or pyro powder before treatment, by being substantially free from decomposition products resulting from the viscosity-reducing operation by being practically insoluble in 95% ethyl alcohol, and by the relatively low viscosities of its solutions, which viscosities, in the case of 8 oz. amyl acetate solutions of new products, range from about 1500 centipoises down to 40 centipoises or less, depending on the original viscosity of the nitrocellulose and the nature of the treatment.

The insolubility in 95% alcohol of such new products as have been subjected to the viscosity-reducing action of alkaline alcohol solutions as compared with the solubility of nitrocellulose before such treatment, may be illustrated by the following data:

| Pyro-nitrocellulose. | % soluble in 95% ethyl alcohol. |
| --- | --- |
| Pyro powder—C. S. lot 1 | 0.6* |
| Pyro powder—C. S. lot 2 | 1.1* |
| Extracted C. S. lot 2—Charge 16 | 0.01 |
| Extracted C. S. lot 1—Charge 19 | 0.03 |

*Corrected for 0.5% diphenylamine.

Solution pyroxylins have a much higher alcohol solubility than pyro powder, an example of this being shown in the following table:

| Pyroxylin. | % soluble in 95% ethyl alcohol. |
| --- | --- |
| Pyroxylin #6062 (untreated) | 4.18 |
| Pyroxylin #6062—after 26 hours digestion with 5% alcoholic NaAc.3H$_2$O and 6 one-hour alcohol extractions | 0.42 |

If an aqueous bleach treatment, followed by aqueous rather than alcoholic treatments, is given as outlined at the bottom of page 3 alcohol solubility may be considerably in excess of 0.5% since the bleaching raises this solubility.

In general, pyro-nitrocellulose has a solubility in 95% ethyl alcohol of at least 1.5%, and solution pyroxylins a solubility of at least 2%, whereas the corresponding solubilities of the reduced viscosity nitrocellulose are usually below 0.5% and in the case of pyro powder, below 0.3%, and frequently below 0.1%.

For the viscosity-reducing agent I prefer to use sodium acetate. As I have indicated above, however, substances whose aqueous solutions are distinctly alkaline are in general effective in accelerating the viscosity reduction. Among these classes of substances there may be mentioned as of first importance the hydroxides of alkali-forming metals, and the salts formed by reaction of such hydroxides with weak acids. This latter class includes the alkali-metal salts of carbonic acid and of monobasic aliphatic acids. Substances having as powerful a denitrating action as calcium sulphide are not satisfactory.

I claim:

1. The process of reducing the viscosity of a cellulose ester which comprises subjecting said ester in the undissolved state to the action of a liquid which is practically a non-solvent for said ester and which contains an alkaline substance, until the desired reduction of viscosity has occurred.

2. The process of reducing the viscosity of a cellulose nitrate which comprises subjecting said cellulose nitrate in the undissolved state to the action of a liquid which is practically a non-solvent for said nitrate and which contains an alkaline substance, until the desired reduction of viscosity has occurred.

3. The process of reducing the viscosity of pyro powder which comprises subjecting said pyro powder in the undissolved state to the action of a liquid which is practically a non-solvent for said powder and which contains an alkaline substance, until the desired reduction of viscosity has occurred.

4. The process of reducing the viscosity of a cellulose ester which comprises heating said ester in the undissolved state in contact with a liquid which is practically a non-solvent for the ester and which contains an alkaline substance in an amount insufficient to cause substantial degradation of the ester, and continuing the heating until the desired reduction of viscosity has occurred.

5. The process of reducing the viscosity of pyro powder which comprises heating said powder in the undissolved state in contact with a liquid which is practically a non-solvent for said powder and which contains an alkaline substance of less denitrating power than that of calcium sulphide, and continuing the heating until the desired reduction of viscosity has occurred.

6. A process as set forth in claim 5 in which the heating of the powder with the alkaline solution is followed by the steps of bleaching the powder with a hypochlorite solution, treating it with a dilute acid solution, and then removing impurities by extraction with a liquid which is a non-solvent for cellulose nitrate.

7. A process as set forth in claim 1 in which the cellulose ester, after the viscosity-reduction treatment, is washed free from decomposition products and other extraneous substances.

8. The process of reducing the viscosity of a cellulose nitrate which comprises heating said cellulose nitrate in the undissolved state with an alcoholic solution of an alkaline substance until the desired reduction of viscosity has occurred.

9. A process as set forth in claim 8 in which the temperature at which the cellulose nitrate is heated is between about 60 and 70° C.

10. A process as set forth in claim 8 in which the alkaline substance is an alkali-forming metal compound.

11. A process as set forth in claim 8 in which the alkaline substance is an alkali-metal hydroxide.

12. A process as set forth in claim 8 in which the alcohol solution contains between 0.05% and 5% of an alkali-metal hydroxide.

13. A process as set forth in claim 8 in which the alkaline substance is an alkali-metal salt of a lower aliphatic acid.

14. A process as set forth in claim 8 in which the alcohol solution contains between 0.05% and 15% of an alkali-metal acetate.

15. The process of reducing the viscosity of pyro powder which comprises heating said powder in the undissolved state in contact with an alcoholic solution of an alkaline substance until the desired reduction of viscosity has occurred.

16. A process as set forth in claim 15 in which the alkaline substance has substantially less denitrating power than that of calcium sulphide.

17. A process as set forth in claim 15 in which the alkaline substance is an alkali-metal compound.

18. The process of reducing the viscosity of pyro powder which comprises heating said powder in the undissolved state at a temperature between about 60 and 70° C. in contact with ethyl alcohol containing from 0.05% to 15% of sodium acetate until the desired reduction of viscosity has occurred.

19. The process of reducing the viscosity of pyro powder whose initial viscosity, as determined upon an 8 oz. amyl acetate solution at 28° C., is more than 4,000 centipoises, which comprises heating said powder in the undissolved state in contact with an alcoholic solution of an alkaline substance until the viscosity value of the powder is less than 1500 centipoises.

20. A process as set forth in claim 8 in which the heating of the cellulose nitrate in contact with the alkaline alcoholic solution is followed by the steps of bleaching the powder with a hypochlorite solution, treating it with a dilute acid solution, and then removing impurities by extraction with a liquid which is a non-solvent for cellulose nitrate.

21. A process as set forth in claim 8 in which the cellulose nitrate, after the viscosity-reduction treatment, is washed free from decomposition products and alkaline substances.

22. A process as set forth in claim 8 in which the cellulose nitrate, after the viscosity-reduction treatment, is washed with hot alcohol until free from decomposition products and alkaline substances.

23. A composition comprising a cellulose nitrate having a viscosity, as determined upon an 8 oz. amyl acetate solution at 28° C., of less than 300 centipoises, said composition being free from decomposition products of the kind formed when cellulose nitrate has undergone a reduction of viscosity.

24. A composition comprising a cellulose nitrate having a viscosity, as determined upon an 8 oz. amyl acetate solution at 28° C., of less than 300 centipoises, said composition being substantially free from coloring matter and from decomposition products of the kind formed when cellulose nitrate has undergone a reduction of viscosity.

25. A composition comprising pyro powder having a viscosity, as determined upon an 8 oz. amyl acetate solution at 28° C., of less than 1700 centipoises, said composition being free from decomposition products of the kind formed when pyro powder has undergone a reduction of viscosity, and the nitrocellulose in which has a solubility of not over 0.3% in 95% ethyl alcohol.

26. Pyro powder having a viscosity, as determined upon an 8 oz. amyl acetate solution at 28° C., of less than 1500 centipoises, a solubility of not over 0.3% in 95% ethyl alcohol, and capable of yielding an 8 oz. amyl acetate solution which is lighter than No. 9 on the Hazen platinum-cobalt standard.

27. Pyro powder having a viscosity, as determined upon an 8 oz. amyl acetate solution at 28° C., of less than 1500 centipoises, a solubility of not over 0.3% in 95% ethyl alcohol, and capable of yielding an 8 oz. amyl acetate solution which is as light as No. 3 on the Hazen platinum-cobalt standard.

28. Pyro powder having a viscosity, as determined upon an 8 oz. amyl acetate solution at 28° C., of less than 1500 centipoises, a solubility of not over 0.3% in 95% ethyl alcohol, and capable of yielding an 8 oz. amyl acetate solution which is as light as No. 2 on the Hazen platinum-cobalt standard.

29. Pyro powder having a viscosity, as determined upon an 8 oz. amyl acetate solution at 28° C., of less than 300 centipoises, and capable of yielding an 8 oz. amyl acetate solution which is lighter than No. 9 on the Hazen platinum-cobalt standard.

30. Pyro powder having a viscosity, as determined upon an 8 oz. amyl acetate solution at 28° C., of less than 100 centipoises, and capable of yielding an 8 oz. amyl acetate solution which is lighter than No. 9 on the Hazen platinum-cobalt standard.

31. Pyro powder having a viscosity, as determined upon an 8 oz. amyl acetate solution at 28° C., of less than 300 centipoises, and capable of yielding an 8 oz. amyl acetate solution which is as light as No. 3 on the Hazen platinum-cobalt standard.

32. A composition comprising nitrocellulose dissolved in a volatile solvent, said nitrocellulose having a solubility of not over 0.5% in 95% ethyl alcohol and a viscosity, as determined upon an 8 oz. amyl acetate solution at 28° C., of less than 1700 centipoises, said composition being free from decomposition products of the kind formed when nitrocellulose has undergone a reduction of viscosity.

33. A composition comprising nitrocellulose dissolved in a volatile solvent, said nitrocellulose having a viscosity value, as determined upon an 8 oz. amyl acetate solution at 28° C., of less than 300 centipoises, and said composition being free from colored decomposition products of the kind formed when nitrocellulose has undergone a reduction of viscosity.

34. A process as set forth in claim 2 in which the cellulose ester, after viscosity-reduction treatment, is washed free from decomposition products and other extraneous substances.

35. A process as set forth in claim 3 in which the cellulose ester, after viscosity-reduction treatment, is washed free from decomposition products and other extraneous substances.

36. A process as set forth in claim 4 in which the cellulose ester, after viscosity-reduction treatment, is washed free from decomposition products and other extraneous substances.

37. A process as set forth in claim 5 in which the cellulose ester, after viscosity-reduction treatment, is washed free from decomposition products and other extraneous substances.

38. A process as set forth in claim 5 in which after heating the powder with the alkaline solution, the powder is treated with an acid.

39. A process as set forth in claim 5 in which after heating the powder with the alkaline solution, the powder is treated with a dilute acid solution to lighten its color.

40. A process as set forth in claim 8 in which after heating the powder with the alkaline solution, the powder is treated with an acid.

41. A process as set forth in claim 5 in which, after heating the powder with the alkaline solution, the powder is subjected to the action of an acid to solubilize impurities, and is extracted with a liquid which is a non-solvent for cellulose nitrate and is capable of removing the solubilized impurities.

42. A process as set forth in claim 8 in which, after heating the powder with the alkaline solution, the powder is subjected to the action of an acid to solubilize impurities, and is extracted with a liquid which is a non-solvent for cellulose nitrate and is capable of removing the solubilized impurities.

43. A process as set forth in claim 5 in which, after heating the powder with the alkaline solution, the powder is treated with a dilute acid solution to render soluble in alcohol certain impurities, and is extracted with alcohol.

44. A process as set forth in claim 8 in which, after heating the powder with the alkaline solution, the powder is treated with a dilute acid solution to render soluble in alcohol certain impurities, and is extracted with alcohol.

45. A process as set forth in claim 5 in which the heating of the powder with the alkaline solution is followed by the steps of bleaching the powder, treating it with a dilute acid solution, and then removing impurities by extraction with a liquid which is a non-solvent for cellulose nitrate.

46. In the treatment of pyro powder to reduce its viscosity and lighten its color, heating said powder and subjecting it to the action of a decolorizing agent.

47. In the treatment of pyro powder to reduce its viscosity and lighten its color, heating said powder in solid form and subjecting it in solid form to the action of a decolorizing agent.

48. In the treatment of pyro powder to reduce its viscosity and lighten its color, heating said powder in solid form and then subjecting it in solid form to the action of a decolorizing agent.

49. In the treatment of pyro powder to reduce its viscosity and lighten its color, heating said powder in solid form and subjecting it in solid form to the action of a substance capable of solubilizing or bleaching coloring agents present in the heated product.

50. A composition comprising a cellulose nitrate having a viscosity, as determined upon an 8 oz. amyl acetate solution at 28° C., of less than 300 centipoises.

51. A composition comprising smokeless powder material having a viscosity, as determined upon an 8 oz. amyl acetate solution at 28° C., of less than 300 centipoises.

52. A composition comprising smokeless powder material having a viscosity, as determined upon an 8 oz. amyl acetate solution at 28° C., of 190 centipoises or less.

53. A composition of matter comprising smokeless powder material which has had its viscosity reduced below the lowest normal viscosity of smokeless powder and its color causing agents rendered inactive so that its solutions are practically colorless.

54. A composition of matter comprising smokeless powder material which has had its viscosity reduced below the lowest normal viscosity and its color causing agent rendered inactive so that said powder gives practically colorless commercial solutions, the viscosity of said powder being such that two to four pounds of it in a gallon of ethyl acetate or other true solvent of approximately its solvent power will give a flowable solution.

In testimony whereof I affix my signature.

EARLE C. PITMAN.

Certificate of Correction.

It is hereby certified that in Letters Patent No. 1,535,438, granted April 28, 1925, upon the application of Earle C. Pitman, of Parlin, New Jersey, for an improvement in "Cellulose Esters of Reduced Viscosity and Processes of Making Same," errors appear in the printed specification requiring correction as follows: Page 2, line 11, before the word "metal" insert the word and hyphen *Alkali-;* page 4, lines 31 and 32, the matter referred to as at the bottom of page 3 is on page 2, in the paragraph ending with line 47; and that the said Letters Patent should be read with these corrections therein that the same may conform to the record of the case in the Patent Office.

Signed and sealed this 21st day of July, A. D. 1925.

[SEAL.]

KARL FENNING,
*Acting Commissioner of Patents.*